United States Patent
Hoetger et al.

(10) Patent No.: US 7,520,133 B2
(45) Date of Patent: Apr. 21, 2009

(54) THERMODYNAMIC ENGINE

(75) Inventors: Michael Hoetger, Berlin (DE); Herbert Clemens, Berlin (DE); Tobias Haas, Berlin (DE); Gunnar Freitag, Berlin (DE); Michael Preis, Koenigsbrunn (DE); Raymond Freymann, Munich (DE); Andreas Obieglo, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 845 days.

(21) Appl. No.: 11/155,598

(22) Filed: Jun. 20, 2005

(65) Prior Publication Data

US 2005/0229595 A1    Oct. 20, 2005

Related U.S. Application Data

(63) Continuation of application No. PCT/EP03/11731, filed on Oct. 21, 2003.

(30) Foreign Application Priority Data

Dec. 19, 2002 (DE) ................. 102 59 488

(51) Int. Cl.
*F01K 23/10* (2006.01)
(52) U.S. Cl. ............... 60/618; 60/614; 60/616
(58) Field of Classification Search ........... 60/272, 60/317, 320, 613–624, 645, 693
See application file for complete search history.

(56) References Cited

U.S. PATENT DOCUMENTS 3,303,646 A * 2/1967 Southam ............. 60/655
5,609,029 A * 3/1997 Ahnger et al. ............ 60/618
5,708,306 A * 1/1998 Lin .................. 307/10.1
6,910,333 B2 * 6/2005 Minemi et al. ........... 60/618

FOREIGN PATENT DOCUMENTS

| DE | 271398 | 3/1914 |
| DE | 310184 | 12/1919 |
| DE | 873461 | 4/1953 |
| DE | 2852076 | 6/1979 |
| DE | 2810191 | 9/1979 |
| DE | 3039392 | 5/1982 |
| DE | 3234679 | 6/1983 |
| EP | 1249580 | 10/2002 |
| JP | 08144850 | 6/1996 |
| WO | WO 02/31319 | 4/2002 |
| WO | WO 02/31320 | 4/2002 |

* cited by examiner

*Primary Examiner*—Terrell L McKinnon
*Assistant Examiner*—Christopher Jetton
(74) *Attorney, Agent, or Firm*—Crowell & Moring LLP

(57) ABSTRACT

A thermodynamic engine converts the superheated steam of at least one working medium into kinetic energy using a decompression device. Said engine includes a low-temperature circuit, in which a first working medium is transported through a first heat exchanger and subsequently through the decompression device and a high-temperature circuit, in which a second working medium is transported through a second heat exchanger and subsequently through the decompression device. The first heat exchanger and the second heat exchanger are located in the exhaust system of an internal combustion engine, and the internal combustion engine a coolant circuit can be used to heat the working mediums in separate collection containers.

14 Claims, 1 Drawing Sheet

THERMODYNAMIC ENGINE

This application is a continuation of International Patent Application No. PCT/EP2003/011731, filed Oct. 21, 2003, the entire disclosure of which is incorporated herein by reference. Priority is claimed based on German Patent Application No. 102 59 488.0, filed Dec. 19, 2002.

BACKGROUND AND SUMMARY OF THE INVENTION

The invention relates to a thermodynamic engine employing superheated vapor to generate kinetic energy.

The invention proceeds from WO 02/31320 A1. The cited document describes a thermodynamic engine for an internal combustion engine which operates according to the Rankine cycle process. The thermodynamic engine is characterized by the fact that it comprises two parallel Rankine cycle processes, in each of which a pump first transports a liquid through a heat exchanger located on an exhaust gas train of an internal combustion engine, the liquid being evaporated, further transported into a decompression device in which the superheated vapor drives a vane pump, and further transported into a condenser in which the residual vapor is condensed. The liquid then flows back through the same circuit. To improve the efficiency of the thermodynamic engine, liquids with different boiling points are used in the circuits. In a proposed embodiment, the circuit with its heat exchanger located closer to the internal combustion engine receives the liquid having the higher boiling temperature. This circuit is a high-temperature circuit, whereas the second circuit is a low-temperature circuit. In order to maintain the efficiency of the high-temperature circuit at a high level, its pump is a variable feed pump.

Although the efficiency of the thermodynamic engine is improved by the above-mentioned measures, the internal combustion engine still releases a large amount of unused thermal energy to the surroundings.

The object of the present invention is to further increase the efficiency of a thermodynamic engine in conjunction with an internal combustion engine.

This object is achieved according to the invention by the fact that, in addition to the waste heat which the internal combustion engine dissipates through the exhaust gas train, use is also made of the waste heat from the coolant circuit for the internal combustion engine in order to regulate the temperature of the working medium in the low-temperature circuit, i.e., the first working medium. "Temperature regulation" is understood to primarily mean heating. The liquid first working medium preheated or heated in this manner is subsequently pumped from a collection container by a pump and is injected via an injection device back into the low-temperature circuit. The injection occurs in the first heat exchanger in order to allow the preheated first working medium to be re-evaporated as quickly as possible in the low-temperature heat [sic] circuit, independent of the available heat and the load requirement. The excess pressure thus produced in the low-temperature circuit is converted to additional kinetic energy in a decompression device. As a result of the temperature regulation, i.e., heating, of the first working medium with the assistance of the coolant circuit for the internal combustion engine, the quantity of heat released by the internal combustion engine is utilized much better for producing mechanical energy. With the proper dimensioning of the thermodynamic engine, a radiator present in the coolant circuit may be advantageously reduced in size or even omitted. The dissipation of heat from the internal combustion engine via the coolant then occurs exclusively in the first collection container in the low-temperature circuit. As a result of the additional possibilities for injection in the low-temperature circuit, very short reaction times, i.e., response times, can be achieved for the decompression device. In principle, separation of the two circuits allows great flexibility in the operating strategy. To increase this benefit even further, an additional heating device is provided in the high-temperature circuit by which the second working medium already in the vapor state is further heated very rapidly and, thus, is superheated. The overall system attains a higher efficiency through the proposed concept. Further advantageous embodiments are the subject matter of the subclaims.

It is also possible to temporarily store the first working medium, which is collected in the first collection container, in both the gaseous and liquid phases. As a result of this phase separation, it is possible to heat the gaseous portion and the liquid portion separately. Whereas the gaseous first working medium is supplied via the first heat exchanger for the decompression device, the working medium in the liquid phase is injected via the injection device back into the low-temperature circuit in the vicinity of the first heat exchanger, evaporated there, and sent to the decompression device. This measure increases the dynamics of the thermodynamic engine.

The low-temperature circuit achieves a further increase in efficiency by additionally regulating the temperature of the first working medium in the first collection container, using the residual heat from the second working medium coming from the decompression device. By use of this measure, the energy still stored in the second working medium, after the decompression device, is also advantageously released to the low-temperature circuit before the second working medium is cooled and liquefied in a condenser.

A second collection container for collecting the liquefied second working medium may also be provided in the high-temperature circuit as well. Further, advantageous use is made of the second collection container to preheat the second working medium with the cooling water from the internal combustion engine before the second working medium is introduced into the second heat exchanger. In this configuration, the coolant for the internal combustion engine is first passed through the first collection container in the low-temperature circuit and then through the second collection container to make use of the residual thermal energy, still stored in the coolant, for preheating or heating of the high-temperature circuit. For this proposed embodiment, in the optimum system design a coolant heat exchanger that is present can be either reduced in size or omitted.

The heating device further may be operated either by electrical power and/or by a fuel, which preferably is the same fuel as for the internal combustion engine. As a result of this measure, a single fuel tank is sufficient, and additional fuels are not necessary. For an internal combustion engine operated on gasoline, there is the option to use a gasoline heating device, and for a diesel engine, to use a diesel heating device, and for a gas-operated engine, to use a gas heating device. Very brief heating times are achievable when an electric heating device is used.

To achieve superheating of the second working medium, the heating device may be radially situated around the exhaust gas system, preferably between two catalytic cleaning devices. This arrangement once again makes optimum use of the thermal energy from the exhaust gas in order to superheat the high-temperature circuit. Energy is withdrawn from the exhaust gas in such a way that the catalytic cleaning device closer to the engine, the precatalyst, quickly comes to operating temperature in order to clean unwanted substances from the exhaust gas. The catalytic cleaning device farther from the engine, the main catalyst, is situated in the direction of flow downstream from the heating device, and is thus substantially protected from overheating. This protection is also provided by installing the heating device, which at the same time is a heat exchanger, upstream from the main catalyst.

The first and second heat exchangers also may be situated downstream from the second catalytic cleaning device to avoid withdrawing too much thermal energy from the exhaust gas upstream from the catalytic cleaning device, and thus eliminating the catalytic effect due to low temperature. The optimum overall efficiency is achieved by the proposed arrangement of the two catalytic cleaning devices, the heating device, and the second and first heat exchangers.

By regulating the volumetric flow of the working media through the decompression device for the low- and high-temperature circuits, it is possible to adapt the operating conditions of the thermodynamic engine to the operating conditions of the internal combustion engine. At full load operation of the internal combustion engine, i.e., at high to maximum power release, the maximum volumetric flow of the working media is set to achieve the optimum energy utilization. At partial load operation or stop-and-go operation, i.e., at average to low power release, the volumetric flow of the working media is correspondingly reduced.

A partial vacuum may be created in the condenser, using the arrangement of an additional pump in the low-temperature circuit between the condenser and the first collection container. This partial vacuum causes the first working medium to liquefy at even lower temperatures and subsequently be further pumped into the first collection container. The efficiency of the low-temperature circuit is improved even more by use of the third pump.

Other objects, advantages and novel features of the present invention will become apparent from the following detailed description of the invention when considered in conjunction with the accompanying drawings.

DETAILED DESCRIPTION

Figure 1:
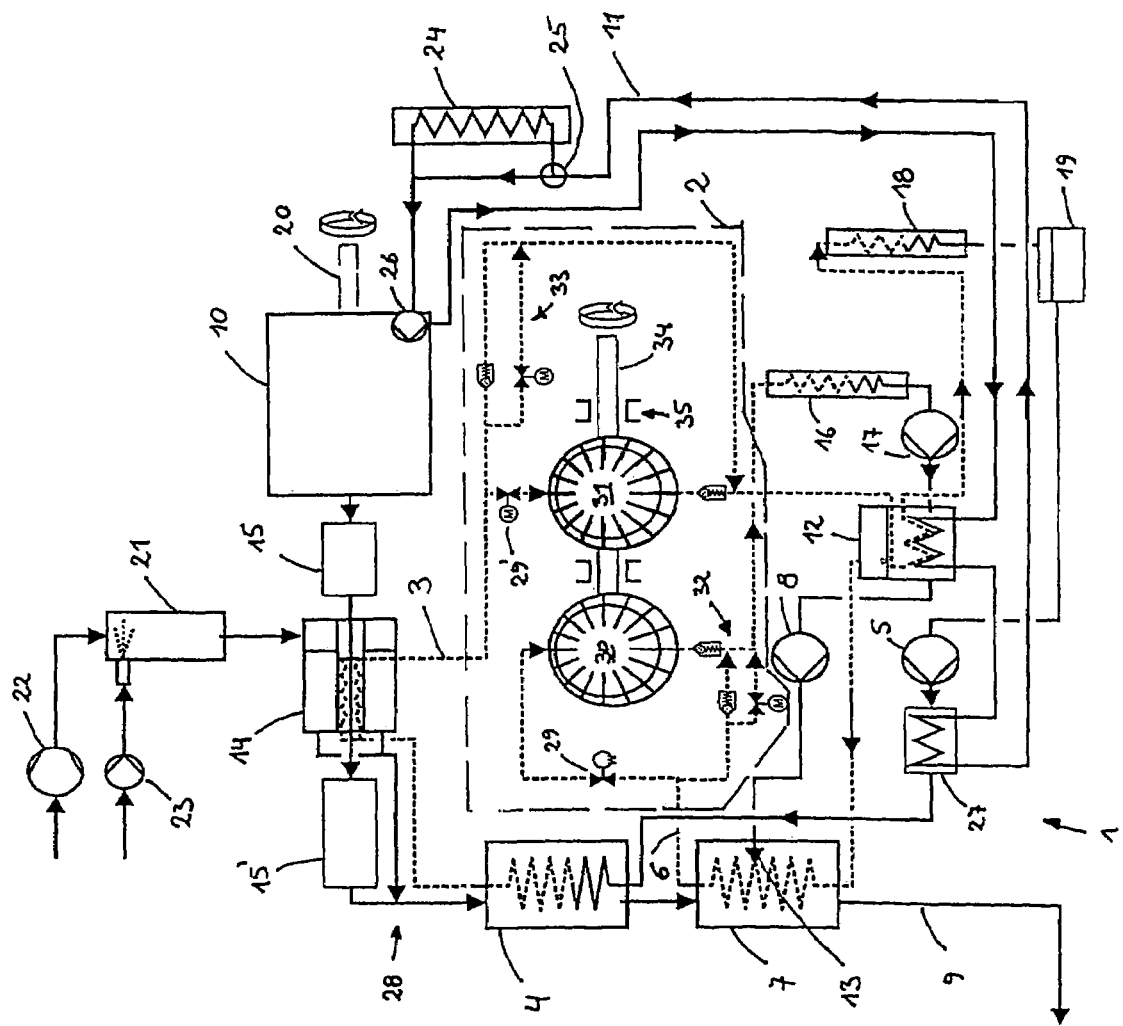
FIG. 1 is a schematic illustration of a thermodynamic engine in accordance with an embodiment of the present invention.

FIG. 1 schematically shows an internal combustion engine 10, the output power of which is supported at a first output shaft 20 by a thermodynamic engine 1. The internal combustion engine 10 has an exhaust gas system 9 for removal of exhaust gases. The exhaust gas system 9 is represented by arrows in the direction of flow of the exhaust gas. Two catalytic cleaning devices 15, 15' are integrated into the exhaust gas system 9. Catalytic cleaning device 15 is a precatalyst, and catalytic cleaning device 15' is a main catalyst. The thermodynamic engine 1 essentially comprises two separate Rankine circuits, a closed low-temperature circuit 6 and a closed high-temperature circuit 3. In the low-temperature circuit 6 a third pump 17 transports a first working medium into a first collection container 12. The liquid first working medium is indicated by a solid line, and the vaporous working medium is indicated by a dotted line. The first working medium is temporarily stored in both liquid and gaseous states in the collection container 12. The pump 17 transports the liquid first working medium from the first collection container 12 into a first heat exchanger 7, where the gaseous first working medium is superheated.

After superheating is achieved, the superheated vapor from the first working medium is passed into a decompression device 2, which essentially comprises a low-temperature expander 30 and a high-temperature expander 31. The superheated vapor is expanded in the low-temperature expander 30 and is subsequently fed to a first condenser 16. The first working medium condenses out in the first condenser 16 and is subsequently transported back to the collection container 12 by the third pump 17. A portion of the liquid first working medium in the first collection container 12 is pumped by a first pump 8 into the first heat exchanger 7, and at that point is injected by an injection device 13 into the low-temperature circuit 6. The volume and/or mass flow of the first working medium in the low-temperature circuit 6 is co-regulated by the injection device 13 in the low-temperature circuit 6.

The second Rankine circuit, the high-temperature circuit 3, has a second working medium, the vaporous and liquid states of which are represented in the same manner as for the first working medium. In the high-temperature circuit 3, a second pump 5 pumps the second working medium from a second collection container 19 into a preheat container 27. From there, the second working medium is further transported into a second heat exchanger 4 in which the second working medium is evaporated. For superheating, the vapor is further transported into a heat exchanger of a heating device 14. This superheated vapor is then fed to the high-temperature expander 31 for the decompression device 2, in which the superheated vapor is expanded and in the cooled state is further transported into the first collection container 12 in order to preheat or heat the first working medium. The second working medium is subsequently fed to a second condenser 18 and is cooled until it condenses, and is collected again in the second collection container 19.

The internal combustion engine 10 also has a coolant circuit 11. In this coolant circuit 11 a fourth pump 26 pumps the heated coolant for the internal combustion engine, initially into the first collection container 12 to heat the liquid first working medium, and subsequently into the preheat container 27 to also preheat the second working medium with the residual thermal energy. The cooled coolant is subsequently pumped back into the internal combustion engine 10. As represented in the exemplary embodiment, an additional switching valve 25 may be provided in the coolant circuit 11, by means of which the coolant can be fed through a third condenser 24, i.e., an engine radiator, and be further cooled before it is returned to the internal combustion engine.

The heating device 14 is a stationary burner which contains a heat exchanger and which is situated between the two catalytic cleaning devices 15, 15'; an alternative arrangement is discussed further below. The heating device is operated with the same fuel, gasoline in this instance, as for the internal combustion engine 10. An air pump 22 and a fuel pump 23 pump the respective reactants into a fuel induction system 21, from which the conditioned fuel/air mixture is fed to the heating device 14. Corresponding to the particular energy demand by the respective high- and low-temperature circuits 3, 6, the first heat exchanger 7 for the low-temperature circuit 6 is situated at the cooler end of the exhaust gas system 9, and the second heat exchanger 4 for the high-temperature circuit 3 is situated in the direction of flow in the hotter region upstream from the exhaust gas system. The heating device 14, which provides for the superheating of the second working medium, is situated between the catalytic cleaning devices 15, 15' and is regulated so that the cleaning characteristics of the catalytic cleaning device 15' are not impaired. The heating device 14 extends radially around the exhaust gas system 9 to achieve optimum heat transfer between the hot exhaust gas and the second working medium. Alternatively, the heating device may also be provided only on a partial circumference of the exhaust gas system 9. After the catalytic cleaning device 15', the exhaust gas from the heating device 14 is passed through an exhaust gas line 28 into the exhaust gas system 9, and thus is likewise available for temperature regulation, i.e., heating, of the first and second working media in the first and second heat exchangers 7, 4.

In the decompression device 2 the low-temperature expander 30 and the high-temperature expander 31 transmit to a second output shaft 34 the thermal energy which has been converted to kinetic energy. The output shaft 34 is supported in a schematically illustrated bearing 35. A control valve 29 operated by an electromotor is located in the inlet to the low-temperature expander 30, and a first regulator 32 comprising two check valves and a motor-driven control valve is situated between the inlet and the vapor discharge outlet. The regulator 32 regulates the vapor volumetric flow rate through the low-temperature expander 30 for rotational speed control, among other parameters. The inlet to the high-temperature expander 31 is likewise provided with a control valve 29' operated by an electromotor, and also with a second regulator 33, likewise comprising two check valves and an additional motor-driven control valve, parallel to its inlet and the vapor discharge outlet. The second regulator 33 likewise regulates the vapor volumetric flow rate through the high-temperature expander 31 for rotational speed control, among other parameters. The mechanical power released from the decompression device 2 to the second output shaft 34 is transmitted via a coupling element (not shown) and a gear transmission (also not shown), which may also be a gear reduction, to the first output shaft 20, and is superimposed on the output power of the internal combustion engine 10.

As an alternative to the exemplary embodiment, each of the condensers 16, 18, 24 may have an additional ventilator for cooling. The pump 17 between the first collection container 12 and the first condenser 16 can generate a partial vacuum in the first condenser 16, thereby significantly supporting the condensation and cooling of the first working medium and resulting in further expansion of the first working medium. The flow through the condenser 18 may also be short-circuited, so that the second working medium coming from the decompression device 2 is returned directly into the second collection container 19.

If the internal combustion engine 10 is operated with a fuel other than gasoline, such as diesel or gas, for example, the heating device 14 is also preferably operated with this fuel. Regardless of the fuel used, the heating device 14 may contain a supplementary electric heating unit for rapid heating, or may be designed entirely as an electric heater.

In a further exemplary embodiment, the catalytic cleaning device 15' may also be situated between the first heat exchanger 7 and the second heat exchanger 4. If heating of the catalytic cleaning device 15' is necessary for this case, this may be provided by an electric heater, for example.

Because the coolant for the internal combustion engine 10 is used for temperature regulation, i.e., heating, for both the low-temperature circuit 6 and the high-temperature circuit 3, in an optimum system design the third condenser 24 and the switching valve 25 may be omitted. For further system optimization, in the decompression device 2 sufficient energy may be withdrawn from both the first and second working media so that the first and second condensers 16, 18 may be omitted as well. For these cases, after the decompression device 2 the working media are fed directly into the collection containers 12 or 19. In a third variant, both the third condenser 24 and the switching valve 25 are present and the first and second condensers 16, 18 are omitted. Switching valves 25 are understood to also include control valves.

In a further embodiment of the thermodynamic engine, the preheat container 27 may be omitted. In this case, the coolant is returned from the first collection container 12 directly back to the internal combustion engine 10.

The low-temperature expander 30 and the high-temperature expander 31 in the illustration are rigidly connected to the second output shaft 34. It is also possible for each expander 30, 31 to be provided with its own output shaft and/or a freewheel, which in turn may be connected to one another and to the first output shaft 20, with or without a fixed or variable gear ratio, by a coupling.

In summary, the following advantages may be listed for the proposed device:

The proposed concept has a high efficiency;
The dynamics of the thermodynamic engine may be regulated via the regulators 32 and 33, the pumps 5, 8, and 17, and the injection device;
For the high-temperature circuit 3 and low-temperature circuit 6, use may be made of the ideal working medium in each case; for example, an alcohol for the low-temperature circuit 6 and water for the high-temperature circuit 3;
The function of the central muffler may be taken over by the first and second heat exchangers 7, 4;
The integration of the first and second heat exchangers 7, 4 into the exhaust gas pipe 9 between the catalytic cleaning devices 15, 15' allows a compact design; and
The design also has the function of exhaust gas pipe insulation between the catalytic cleaning devices 15, 15'.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE NUMBERS

1 Thermodynamic engine
2 Decompression device
3 High-temperature circuit
4 Second heat exchanger
5 Second pump
6 Low-temperature circuit
7 First heat exchanger
8 First pump
9 Exhaust gas system
10 Internal combustion engine
11 Coolant circuit
12 First collection container
13 Injection device
14 Heating device
15, 15' Catalytic cleaning device
16 First condenser
17 Third pump
18 Second condenser
19 Second collection container
20 First output shaft
21 Fuel induction system
22 Air pump
23 Fuel pump
24 Third condenser
25 Switching valve
26 Fourth pump 27 Preheat container
28 Exhaust gas line
29, 29' Control valve
30 Low-temperature expander
31 High-temperature expander
32 First regulator
33 Second regulator
34 Second output shaft
35 Bearing

What is claimed is:

1. Thermodynamic engine which converts thermal energy of a superheated vapor into kinetic energy in a decompression device, comprising:
    a low-temperature circuit in which a first working medium is transported by a first pump through a first heat exchanger and subsequently through the decompression device, and
    a high-temperature circuit in which a second working medium is transported by a second pump through a second heat exchanger and subsequently through the decompression device,
    the first heat exchanger and the second heat exchanger being provided on an exhaust gas system of an internal combustion engine,
    wherein
    the internal combustion engine has a coolant circuit which regulates the temperature of the first working medium in a first collection container,
    the low-temperature circuit has an injection device which injects first working medium withdrawn from the low-temperature circuit back into the low-temperature circuit in the vicinity of the first heat exchanger, and
    the high-temperature circuit between the second heat exchanger and the decompression device has a heating device for the second working medium.

2. Device according to claim 1, wherein the first working medium in the first collection container is present in at least one of a gaseous and a liquid phase.

3. Device according to claim 2, wherein the injection device injects the first working medium in the liquid phase back into the low-temperature circuit.

4. Device according to claim 1, wherein the temperature of the first working medium in the first collection container is regulated by the second working medium.

5. Device according to claim 1, wherein the high-temperature circuit has a second collection container for the second working medium.

6. Device according to claim 5, wherein the temperature of the second working medium in the second collection container is regulated by the coolant circuit before being introduced into the second heat exchanger.

7. Device according to claim 1, wherein the heating device is operated by at least one of electrical power and a fuel.

8. Device according to claim 7, wherein the fuel for the heating device is also provided for the internal combustion engine.

9. Device according to claim 1, wherein the heating device is situated radially around the exhaust gas system or is situated, at least in sections, directly on the exhaust gas system.

10. Device according to claim 9, wherein the exhaust gas system has two catalytic cleaning devices, and the heating device is situated between one of the catalytic cleaning devices and downstream from the catalytic cleaning devices.

11. Device according to claim 1, wherein the first and second heat exchangers are provided downstream from the catalytic cleaning devices in the direction of flow of an exhaust gas.

12. Device according to claim 1, wherein the volumetric flow of at least one of the first and second working medium passing through the decompression device can be regulated.

13. Device according to claim 1, wherein the low-temperature circuit has a condenser situated downstream from the decompression device in the direction of transport of the working medium, and a third pump is provided in the low-temperature circuit between the condenser and the first collection container.

14. A thermodynamic engine, comprising:
    a low-temperature circuit, in which a first working medium is transported by a first pump through a first heat exchanger and subsequently through a decompression device which generates kinetic motion; and
    a high-temperature circuit, in which a second working medium is transported by a second pump through a second heat exchanger and subsequently through the decompression device,
    wherein
    the first heat exchanger and the second heat exchanger are arranged on an exhaust gas system of an internal combustion engine such that the heat exchangers receive exhaust heat from the internal combustion engine,
    a temperature of a portion of the first working medium in a first collection container may be regulated by an engine coolant circuit of the internal combustion engine,
    the low-temperature circuit has an injection device which injects first working medium withdrawn from the low-temperature circuit back into the low-temperature circuit in the vicinity of the first heat exchanger, and
    the high-temperature circuit has a heating device between the second heat exchanger and the decompression device for heating the second working medium.

* * * * *